(12) United States Patent
Cepulis

(10) Patent No.: US 7,383,429 B2
(45) Date of Patent: Jun. 3, 2008

(54) CONFIGURING SETTINGS OF A COMPUTER SYSTEM TO BE COMPATIBLE WITH AN OPERATING SYSTEM

(75) Inventor: Darren J. Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 10/739,540

(22) Filed: Dec. 18, 2003

(65) Prior Publication Data
US 2005/0198484 A1 Sep. 8, 2005

(51) Int. Cl.
G06F 9/00 (2006.01)
G06F 9/24 (2006.01)
G06F 15/177 (2006.01)

(52) U.S. Cl. .............. 713/1; 713/2; 713/100
(58) Field of Classification Search ............ 713/1, 713/2, 100
See application file for complete search history.

(56) References Cited

U.S. PATENT DOCUMENTS

| | | | |
|---|---|---|---|
| 5,734,831 A | 3/1998 | Sanders | |
| 6,094,531 A * | 7/2000 | Allison et al. | 717/176 |
| 6,098,097 A * | 8/2000 | Dean et al. | 709/220 |
| 6,629,145 B1 | 9/2003 | Pham et al. | |
| 6,728,877 B2 * | 4/2004 | Mackin et al. | 713/100 |
| 2002/0095595 A1 * | 7/2002 | Christopherson et al. | 713/200 |
| 2002/0103996 A1 | 8/2002 | LeVasseur et al. | |
| 2003/0023603 A1 | 1/2003 | Ellison et al. | |
| 2003/0046682 A1 | 3/2003 | Crespo et al. | |
| 2003/0217126 A1 * | 11/2003 | Polcha et al. | 709/220 |
| 2004/0236997 A1 * | 11/2004 | Poo | 714/36 |
| 2004/0268340 A1 * | 12/2004 | Steeb et al. | 717/174 |

* cited by examiner

Primary Examiner—Rehana Perveen
Assistant Examiner—Michael J. Brown

(57) ABSTRACT

During a power-on sequence of a computer system, it is detected whether the computer system is connected over a first type of connection to a terminal. In response to detecting that the computer system is connected over the first type of connection to the terminal, settings of the computer system are configured to be compatible with a first type of operating system.

17 Claims, 3 Drawing Sheets

CONFIGURING SETTINGS OF A COMPUTER SYSTEM TO BE COMPATIBLE WITH AN OPERATING SYSTEM

BACKGROUND

A computer system includes a number of components, such as a central processing unit (CPU), system memory, mass storage devices, software such as an operating system and application software, and peripheral components. A computer system can be used as a stand-alone device, or the computer system can be connected to a network to enable communication with other computer systems, including servers and other user stations. A server in a computer network environment provides a number of different services, including storage of user information, storage of application software that can be loaded onto user stations for execution, storage of configuration information to configure user stations, provision of electronic mail services, provision of web access services, and so forth.

In many business and educational facilities (e.g., large corporations, universities, and so forth), a large number of servers can be present. In some cases, servers may be provided in racks in server rooms within a building. There can potentially be hundreds or even thousands of servers in some facilities.

To place servers into service, the servers are set up by a system administrator. The system administrator can either perform local setup of servers (the system administrator is located in the same room as the servers), or the system administrator can perform remote setup of servers. Setting up a small number of servers is a relatively easy task, which usually does not consume too much time. However, for facilities that include large numbers of servers, the server setup process can be quite tedious and time consuming.

In a network environment, servers can be configured to run one of several different types of operating systems. Depending on which type of operating system is to be loaded on a given server, the system administrator may have to configure settings in the server differently. Typically, server settings are set by a system administrator through a setup utility that is activated by the administrator pressing a predetermined function key (e.g., F9, F10, etc.) during the initial stages of a power-on sequence of the server. In the setup utility, the system administrator can select the various server settings for a target operating system. Such manual configuration of operating systems settings for a large number of servers can be tedious and time consuming.

SUMMARY

In general, methods and apparatus are provided to configure settings of a computer system for a given operating system. In one embodiment, a method of configuring a computer system includes detecting, during a power-on sequence, whether the computer system is connected over a first type of connection to a terminal. In response to detecting that the computer system is connected over the first type of connection to the terminal, settings of the computer system are configured to be compatible with a first type of operating system.

Other features will become apparent from the following description, from the drawings, and from the claims.

DETAILED DESCRIPTION

Figure 1:
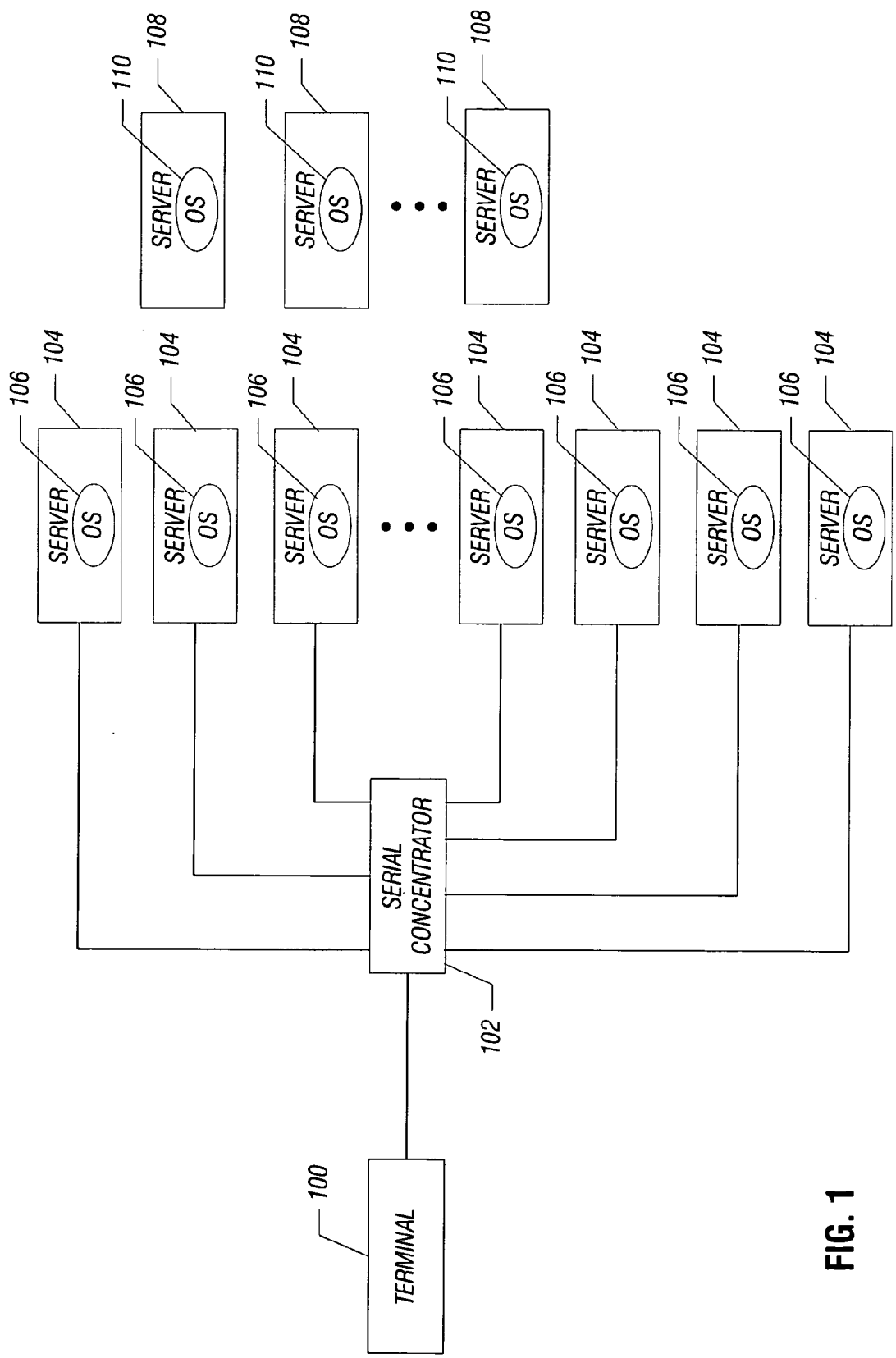
FIG. 1 is a block diagram of an arrangement of servers that incorporate an embodiment of the invention, with some of the servers connected to a system administrator terminal over serial links.

FIG. 1 illustrates an arrangement of servers 104 that are coupled to a system administrator terminal 100 through a serial link that includes a serial concentrator 102. The arrangement depicted in FIG. 1 also includes servers 108 not connected over the serial link to the system administrator terminal 100. The serial concentrator 102 is basically a switch that enables selective connection of the system administrator terminal 100 to the serial port of one of the servers 104. The system administrator terminal 100 is used by a system administrator to perform setup of the servers 104 to which the terminal 100 is connected.

The system administrator terminal 100 can be any of a number of different types of terminals. In one example, the terminal 100 is a VT100 (Video Terminal 100) terminal. The terminal 100 can be an actual VT100 terminal, or it can be a computer that runs emulation software to emulate a VT100 terminal. A VT100 terminal uses control codes defined by the American National Standards Institute (ANSI). In other embodiments, another type of terminal 100 can be used. Alternatively, the terminal 100 can be connected to other ports (such as a parallel port, a Peripheral Component Interconnect (PCI) port, and so forth) of each server 104.

Using the terminal 100, a system administrator can optionally access a setup utility, such as a setup utility associated with a power-on routine, of each of the servers 104 to which the terminal 100 is connected. Through the setup utility, the system administrator can configure various settings of each server 100. However, in accordance with some embodiments of the invention, to enhance setup efficiency, the system administrator does not have to use the setup utility of each server 104 to configure settings in the server 104 for an operating system 106 that is to be loaded into the server 104. Settings in the server 104 that are to be configured for a particular type of the operating system 106 are referred to as operating system settings. More generally, "operating system settings" refers to the configurable settings of a server (or other computer system) that vary by different types of operating systems.

Examples of operating system settings include the following settings: multiprocessor specification (MPS) table mode, PCI hot-plug resource usage, and memory configuration setting. The MPS table mode specifies to the operating system how interrupts (such as PCI IRQs) are to be routed in the server. The PCI hot-plug feature enables PCI adapter cards to be inserted and removed into PCI slots of the server without having to shut the server down. PCI hot-plug resource usage refers to the usage of various resources in the server, including I/O (input/output) address space, memory address space, and other resources for purposes of hot-plugging adapter cards. The memory configuration setting refers to settings of memory devices that make up the system memory in a server.

As noted, the settings listed above (as well as other settings) differ by different types of operating systems. Thus, such operating system settings may have to be configured a first way to be compatible with a first type of operating system, a second way to be compatible with a second type of operating system, and so forth. There are several types of operating systems, including Linux, Unix, WINDOWS®, and others, that can be loaded into each of the servers 104

(and servers 108). Although the discussion below focuses on the servers 104, the same tasks are also performed by servers 108.

According to some embodiments of the invention, during a power-on sequence of each server 104, the server 104 detects whether the server is connected over a serial link to the system administrator terminal 100. In one embodiment, a first type of operating system is indicated if a system administrator uses the terminal 100 (which can be a VT100 terminal in one example) connected over a serial link to configure the server 104. In other words, use of the terminal 100 connected over a serial link to the server 104 is an indication that the system administrator will be loading the first type of operating system onto the server 104 at a subsequent stage. For example, the first type of an operating system can be a Linux operating system, which is compatible with the serial link connection to a VT100 terminal.

In response to detecting that the server 104 is connected over a serial link to the system administrator terminal 100, the server 104 automatically configures operating system settings to be compatible with the first type of operating system. However, if the server 104 detects, during the power-on sequence, that the server is not connected to the terminal 100 over a serial link, then the server 104 configures operating system settings to be compatible with a second type of operating system. In alternative embodiments, instead of the server 104 performing automatic configuration of operating system settings in response to detection of whether the server 104 is connected to the terminal 100 over a serial link, the server 104 can detect for a different type of connection.

As noted above, in one embodiment, the first type of operating system can be a Linux operating system, while the second type of operating system can be a WINDOWS® operating system. In other embodiments, the first type of operating system can be another operating system, such as Unix or WINDOWS®, while the second type of operating system is different from the first type of operating system.

The servers 108 depicted in FIG. 1 are servers that are not set up by the system administrator terminal 100 connected over a serial link. The servers 108 are set up differently, either directly at each server 108 or by connecting the system administrator terminal 100 (or another terminal) over a different type of link to server 108. As a result, the server 108 configures operating system settings to be compatible with a second type of operating system 110 (that is to be loaded into the server 108), rather than the first type of operating system.

Effectively, each of the servers 104 and 108 is capable of automatically configuring operating system settings depending upon whether or not the server has a specific type of connection to a system administrator terminal 100. Automatic configuration of operating system settings refers to configuration of operating system settings performed by a component of a computer system (such as by a power-on routine) without a manual manipulation through a setup utility.

In other embodiments, rather than have two options, the server can automatically perform configuration of operating system settings for more than two types of operating systems.

Figure 2:
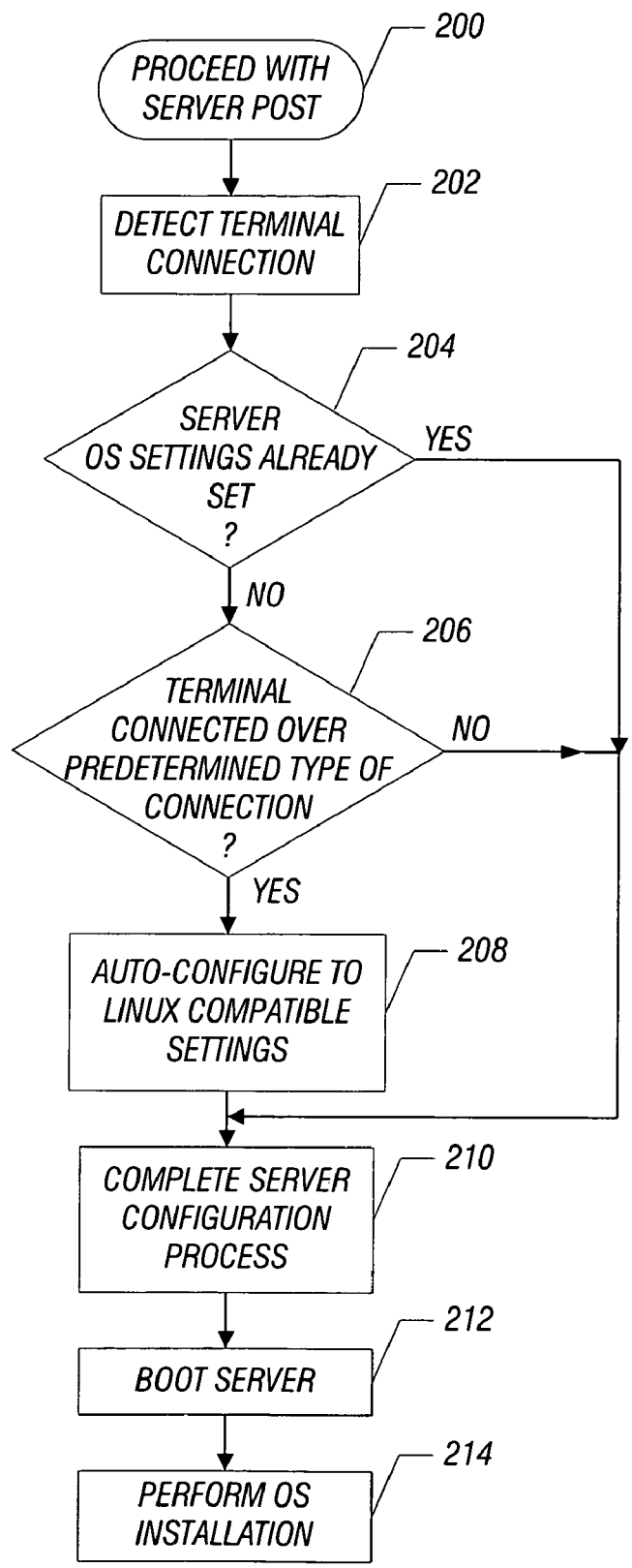
FIG. 2 is a flow diagram of a process of setting up a server, in accordance with an embodiment.

FIG. 2 illustrates a flow diagram of a process of configuring settings in a server, according to one embodiment of the invention. When initially powering on, the server performs power-on self-test (at 200), which is a power-on sequence of the server. The power-on sequence is controlled by a power-on routine, which in some embodiments is a basic input/output systems (BIOS) routine. The power-on routine detects (at 202) that it is connected to the terminal 100. Next, the power-on routine determines if the operating system settings for the server have already been set. If so, the server configuration process is completed (at 210).

However, if the server operating system settings have not been set, as determined at 204, then the power-on sequence determines if the terminal is connected over a predetermined type of connection (at 206), such as the serial link discussed above. If so, the power-on routine performs auto-configuration (at 208) of operating system settings to be compatible with the first type of operating system (e.g., Linux). The server configuration process is then completed (at 210). Next, the server is booted (at 212), followed by installation of the operating system (at 214). During operating system installation, the server may prompt a system administrator to load a storage medium (such as a floppy diskette, compact disk, or digital video disk) that contains the code for the operating system.

Note that the process of configuring settings discussed herein can be applied for configuring other types of computer systems besides servers.

Figure 3:
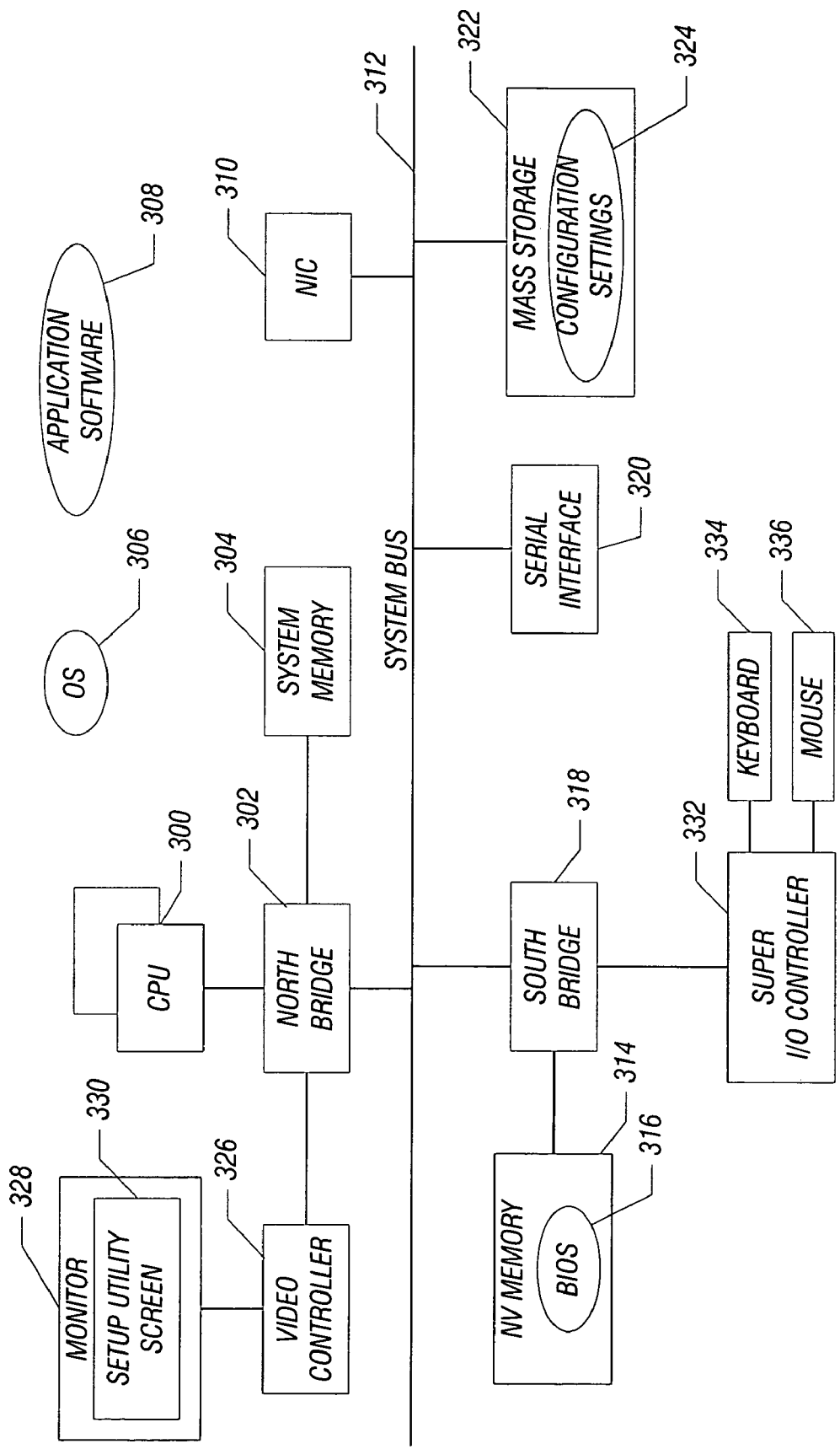
FIG. 3 is a block diagram of a server that embodies an embodiment of the invention.

FIG. 3 illustrates an example arrangement of a server (either server 104 or 108 in FIG. 1) that incorporates some embodiments of the invention. The server includes a central processing unit (CPU) 300 (or multiple CPUs). The CPU(s) 300 is connected to a north bridge 302, which includes circuitry for connection to system memory 304, a system bus 312, and a video controller 326. In one example, the system bus 312 can be a PCI bus. The system bus 312 is in turn connected to a south bridge 318, which is connected to non-volatile memory 314. A BIOS routine 316 is stored in the non-volatile memory. During a power-on sequence of the server, the BIOS routine 316 is loaded for execution by the CPU(s) 300.

The south bridge 318 is also connected to a super I/O controller 332, which contains I/O interface circuitry connected to a keyboard 334, a mouse 336, and other I/O devices.

The system bus 312 is also connected to various other bus devices, including a network interface controller (NIC) 310, a serial interface 320, and a mass storage device 322. The mass storage device 322 stores user and system data, software instructions, and configuration settings 324 that are set by the BIOS routine 316 during the configuration stage of the power-on sequence. The serial interface 320 is connected over the serial link to the system administrator terminal 100 (FIG. 1). In alternative embodiments, the server can be connected to the terminal 100 (or another terminal) in a different way, such as through the NIC 310 or through another interface of the server.

The video controller 326 is connected to a monitor 328, which can display a setup utility screen 330 in response to a user pressing a particular key (e.g., F9, F10) on the keyboard 334 during the power-on sequence. Note that if the system administrator is remotely configuring the server, the setup utility screen 330 can be presented at the remote terminal 100 in response to activation of keys on a keyboard of the remote terminal 100. The server also includes software such as an operating system 306 and application software 308.

Instructions of the various software routines or modules discussed herein (such as the BIOS routine 316, operating system 306, application software 308, and so forth) are executed on corresponding control modules. The control modules include microprocessors (such as the CPU 300), microcontrollers, processor modules or subsystems (including one or more microprocessors or microcontrollers), or other control or computing devices. As used here, a "controller" refers to hardware, software, or a combination thereof, for performing various tasks. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of configuring a computer system, comprising:
   performing a power-on sequence;
   during the power-on sequence, detecting whether the computer system is connected over a first type of connection to a terminal;
   in response to detecting that the computer system is connected over the first type of connection to the terminal, configuring settings of the computer system to be compatible with a first type of operating system; and
   in response to detecting that the computer system is not connected over the first type of connection to the terminal, configuring the settings of the computer system to be compatible with a second, different type of operating system.

2. The method of claim 1, wherein detecting whether the computer system is connected to the terminal over the first type of connection comprises detecting whether the computer system is connected over a serial link.

3. The method of claim 1, wherein detecting whether the computer system is connected to the terminal over the first type of connection comprises detecting whether the computer system is connected over a link to a VT100 terminal.

4. The method of claim 1, wherein configuring the settings comprises configuring one or more of the following settings: multiprocessor specification table mode, hot-plug resource usage, and memory configuration.

5. The method of claim 1, wherein configuring the settings comprises configuring the settings to be compatible with a Linux operating system.

6. The method of claim 1, wherein configuring the settings comprises configuring the settings to be compatible with a Unix operating system.

7. The method of claim 1, wherein configuring the settings comprises configuring the settings to be compatible with a WINDOWS® operating system.

8. The method of claim 1, further comprising:
   loading the first type of operating system if the settings of the computer system are configured to be compatible with the first type of operating system; and
   loading the second type of operating system if the settings are configured to be compatible with the second type of operating system.

9. A computer system comprising:
   a processor;
   an interface to be connected over a first type of connection to a terminal; and
   a power-on routine executable on the processor to:
      detect whether the interface is connected over the first type of connection to the terminal,
      in response to detecting that the interface is connected over the first type of connection to the terminal, configure settings in the computer system to be compatible with a first type of operating system, and
      in response to detecting that the interface is not connected over the first type of connection to the terminal, configure settings of the computer system to be compatible with a second type of operating system.

10. The computer system of claim 9, wherein the interface comprises a serial interface.

11. The computer system of claim 9, wherein the interface is adapted to be connected over a link to a VT100 terminal.

12. The computer system of claim 9, wherein the power-on routine comprises a basic input/output system (BIOS) routine.

13. An article comprising at least one storage medium containing instructions that when executed cause a computer system to:
   detect whether the computer system is connected to a terminal over a first type of connection;
   in response to detecting that the computer system is connected to the terminal over the first type of connection, configure settings of the computer system to be compatible with a first type of operating system; and
   in response to detecting that the computer system is not connected to the terminal over the first type of connection, configure settings of the computer system to be compatible with a second, different time of operating system.

14. The article of claim 13, wherein the instructions when executed cause the computer system to invoke a power-on routine to perform the detecting and configuring.

15. The article of claim 14, wherein invoicing the power-on routine comprises invoking a basic input/output system (BIOS) routine.

16. The article of claim 13, wherein the first type of connection is a serial link,
   wherein configuring the settings of the computer system to be compatible with the first type of operating system is in response to detecting that the computer system is connected to the terminal over the serial link,
   wherein the configuring of the settings of the computer system to be compatible with the second type of operating system is in response to detecting that the computer system is not connected to the terminal over the serial link.

17. A computer system comprising:
means for performing a power-on sequence;
means for detecting, during the power-on sequence, whether the computer system is connected over a serial link to a terminal; and
means for configuring settings of the computer system to be compatible with a first type of operating system in response to detecting tat the computer system is connected over the serial link to the terminal,
the configuring means for configuring settings of the computer system to be compatible wit a second, different type of operating system in response to detecting that the computer system is not connected over the serial link to the terminal.

* * * * *

UNITED STATES PATENT AND TRADEMARK OFFICE
CERTIFICATE OF CORRECTION

PATENT NO. : 7,383,429 B2
APPLICATION NO. : 10/739540
DATED : June 3, 2008
INVENTOR(S) : Darren J. Cepulis Page 1 of 1

It is certified that error appears in the above-identified patent and that said Letters Patent is hereby corrected as shown below:

In column 6, line 52, in Claim 13, delete "time" and insert -- type --, therefor.

In column 6, line 57, in Claim 15, delete "invoicing" and insert -- invoking --, therefor.

In column 8, line 1, in Claim 17, delete "tat" and insert -- that --, therefor.

In column 8, line 4, in Claim 17, delete "wit" and insert -- with --, therefor.

Signed and Sealed this

Tenth Day of February, 2009

JOHN DOLL
*Acting Director of the United States Patent and Trademark Office*